United States Patent [19]

Sander et al.

[11] Patent Number: 5,283,273
[45] Date of Patent: Feb. 1, 1994

[54] STABILIZED CHLORINE-CONTAINING POLYMERS

[75] Inventors: Hans J. Sander, Lorsch; Olaf-René Hartmann; Hermann O. Wirth, both of Bensheim, all of Fed. Rep. of Germany

[73] Assignee: Ciba-Geigy Corporation, Ardsley, N.Y.

[21] Appl. No.: 18,345

[22] Filed: Feb. 16, 1993

Related U.S. Application Data

[63] Continuation of Ser. No. 797,130, Nov. 22, 1991, abandoned.

[30] Foreign Application Priority Data

Nov. 30, 1990 [DE] Fed. Rep. of Germany ....... 3792/90

[51] Int. Cl.$^5$ ............................................. C08K 5/3435
[52] U.S. Cl. ...................................... 524/99; 524/100; 524/102; 524/357; 524/399
[58] Field of Search ................. 524/399, 357, 99, 100, 524/102

[56] References Cited

U.S. PATENT DOCUMENTS

| | | | |
|---|---|---|---|
| 4,102,839 | 7/1978 | Crochemore et al. | 524/399 |
| 4,267,083 | 5/1981 | Torloting | 524/97 |
| 4,692,486 | 9/1987 | Gugumus | 524/100 |
| 4,822,833 | 4/1989 | Zappia et al. | 524/97 |
| 4,908,398 | 3/1990 | Li Bassi et al. | 524/99 |
| 4,957,954 | 9/1990 | Iizuka et al. | 524/100 |
| 5,070,128 | 12/1991 | Gay | 524/357 |

FOREIGN PATENT DOCUMENTS

| | | |
|---|---|---|
| 0051334 | 5/1982 | European Pat. Off. . |
| 0422335 | 4/1991 | European Pat. Off. . |
| 57-168933 | 10/1982 | Japan . |
| 61-163965 | 7/1986 | Japan . |
| 63-178155 | 7/1988 | Japan . |
| 1-299854 | 12/1989 | Japan . |

OTHER PUBLICATIONS

J. B. Adenyi et al: Polymer Degradation and Stability, 17 (1987) 117–129.

*Primary Examiner*—Veronica P. Hoke
*Attorney, Agent, or Firm*—Luther A. R. Hall

[57] ABSTRACT

Chlorine-containing polymers can be stabilized against thermal and actinic degradation by addition of a) a sterically hindered amine, b) a zinc compound, c) a calcium, magnesium and/or barium compound, and d) a 1,3-dicarbonyl compound. Other additives such as phosphites or epoxides can further improve the stabilization.

18 Claims, No Drawings

STABILIZED CHLORINE-CONTAINING POLYMERS

This is a continuation of application Ser. No. 07/797,130, filed on Nov. 22, 1991, now abandoned.

The invention relates to stabilised chlorine-containing polymer compositions which contain a sterically hindered amine in combination with other stabilisers.

It is known that sterically hindered amines, for example derivatives of 2,2,6,6-tetramethylpiperidine, are excellent stabilisers for polymers against damage by short-wave light. However, addition of sterically hindered amines of this type to polyvinyl chloride or other chlorine-containing polymers frequently results in discoloration during processing or on use. Only addition of costabilisers allows this discoloration to be prevented or reduced.

Thus, JP-A-82/168 933 describes films made from plasticised polyvinyl chloride which are protected against light by means of a sterically hindered amine and a UV absorber and contain, as costabilisers, zinc stearate, barium stearate and epoxidised soya oil. JP-A-86/163 965 describes the stabilisation of PVC by means of a sterically hindered amine, a calcium/zinc stabiliser and epoxidised soya oil.

EP-A-237 485 recommends a combination of sterically hindered amines and organotin stabilisers for stabilising rigid PVC, with further possible additives being titanium dioxide and calcium stearate. EP-A-421 933 proposes a combination of sterically hindered amines and zinc compounds and a hydrotalcite for stabilising chlorine-containing polymers, where further possible additives are 1,3-diketones and calcium compounds.

EP-A-432 096 proposes a combination of sterically hindered amines and zinc compounds and a blowing agent or foaming agent, it also being possible to use calcium compounds and 1,3-diketones.

It has now been found that stabiliser combinations of this type give very satisfactory results, even without organotin stabilisers and without hydrotalcite and without blowing agents or foaming agents, if they contain a zinc compound, a calcium, magnesium or barium compound and a 1,3-dicarbonyl compound.

The invention therefore relates to a stabilised chlorine-containing polymer composition comprising
a) at least one chlorine-containing polymer,
b) at least one sterically hindered amine,
c) at least one organic or inorganic zinc compound,
d) at least one organic or inorganic calcium, magnesium and/or barium compound, and
e) at least one 1,3-dicarbonyl compound,
but no organotin compounds, no hydrotalcite compounds and no blowing agents or foaming agents.

The chlorine-containing polymer may be, for example, a polymer or copolymer of vinyl chloride or of vinylidene chloride or a post-chlorinated polymer or copolymer of vinyl chloride or of vinylidene chloride, a chlorinated polyolefin, for example a chlorinated polyethylene, a chlorinated polymer or copolymer of styrene or of butadiene or a chlorinated rubber or a rubber hydrochloride, or a mixture of a chlorine-containing polymer of this type and another chlorine-containing or chlorine-free polymer. The chlorine-containing polymer is preferably a polyvinyl chloride or a copolymer containing at least 80% of vinyl chloride or a mixture (polyblend) of a homopolymer or copolymer of this type with another chlorine-containing or chlorine-free polymer. The chlorine-containing polymer may be an emulsion, suspension or bulk polymer.

The sterically hindered amine is preferably a polyalkylpiperidine derivative and preferably contains at least one group of the formula I

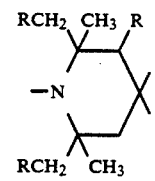

in which R is hydrogen or methyl, and is in particular a derivative of 2,2,6,6-tetramethylpiperidine of the formula I in which R is hydrogen. These compounds are preferably substituted in the 4-position of the piperidine ring by one or two polar groups or by one spiro ring system. These compounds may be low-molecular-weight or oligomeric or polymeric compounds.

The following classes of polyalkylpiperidines are particularly important: a) Compounds of the formula II

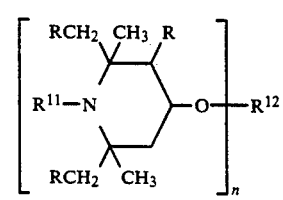

in which n is a number from 1 to 4, preferably 1 or 2, R is hydrogen or methyl, $R^{11}$ is hydrogen, oxyl, hydroxyl, $C_1$–$C_{12}$alkyl, $C_3$–$C_8$alkenyl, $C_3$–$C_8$alkynyl, $C_7$–$C_{12}$aralkyl, $C_1$–$C_{18}$alkoxy, $C_5$–$C_8$cycloalkoxy, $C_7$–$C_9$-phenylalkoxy, $C_1$–$C_8$alkanoyl, $C_3$–$C_5$alkenoyl, $C_1$–$C_{18}$alkanoyloxy, benzyloxy, glycidyl or a —CH$_2$CH(OH)—Z group in which Z is hydrogen, methyl or phenyl, $R^{11}$ preferably being H, $C_1$–$C_4$alkyl, allyl, benzyl, acetyl or acryloyl, and $R^{12}$, if n is 1, is hydrogen, $C_1$–$C_{18}$alkyl, which may be interrupted by one or more oxygen atoms, cyanoethyl, benzyl, glycidyl, a monovalent radical of an aliphatic, cycloaliphatic, aralphatic, unsaturated or aromatic carboxylic acid, carbamic acid or phosphorus-containing acid, or a monovalent silyl radical, preferably a radical of an aliphatic carboxylic acid having 2 to 18 carbon atoms, of a cycloaliphatic carboxylic acid having 7 to 15 carbon atoms, of an α,β-unsaturated carboxylic acid having 3 to 5 carbon atoms or of an aromatic carboxylic acid having 7 to 15 carbon atoms; if n is 2, $R^{12}$ is $C_1$–$C_{12}$alkylene, $C_4$–$C_{12}$alkenylene, xylylene, a divalent radical of an aliphatic, cycloaliphatic, aralphatic or aromatic dicarboxylic acid, dicarbamic acid or phosphorus-containing acid, or a divalent silyl radical, preferably a radical of an aliphatic dicarboxylic acid having 2 to 36 carbon atoms, of a cycloaliphatic or aromatic dicarboxylic acid having 8 to 14 carbon atoms or of an aliphatic, cycloaliphatic or aromatic dicarbamic acid having 8 to 14 carbon atoms; if n is 3, $R^{12}$ is a trivalent radical of an aliphatic, cycloaliphatic or aromatic tricarboxylic acid, of an aromatic tricarbamic acid or of a phosphorus-containing acid, or a trivalent silyl radical; and if n is 4, $R^{12}$ is a tetravalent radical of an aliphatic, cycloaliphatic or aromatic tetracarboxylic acid.

Any $C_1$-$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

$C_1$-$C_{18}$alkyl $R^{11}$ or $R^{12}$ is, for example, one of the abovementioned groups or, for example, n-tridecyl, n-tetradecyl, n-hexadecyl or n-octadecyl.

$C_3$-$C_8$alkenyl $R^{11}$ may be, for example, 1-propenyl, allyl, methallyl, 2-butenyl, 2-pentenyl, 2-hexenyl, 2-octenyl or 4-tert-butyl-2-butenyl.

$C_3$-$C_8$alkynyl $R^{11}$ is preferably propargyl.

$C_7$-$C_{12}$aralkyl $R^{11}$ is, in particular, phenethyl or especially benzyl.

$C_1$-$C_8$alkanoyl $R^{11}$ is, for example, formyl, propionyl, butyryl or octanoyl, preferably acetyl, and $C_3$-$C_5$alkenoyl $R^{11}$ is, in particular, acryloyl.

A monovalent carboxylic acid radical $R^{12}$ is, for example, an acetic acid, caproic acid, stearic acid, acrylic acid, methacrylic acid, benzoic acid or β-(3,5-di-tert-butyl-4-hydroxyphenyl)propionic acid radical.

A divalent dicarboxylic acid radical $R^{12}$ is, for example, a malonic acid, succinic acid, glutaric acid, adipic acid, suberic acid, sebacic acid, maleic acid, itaconic acid, phthalic acid, dibutylmalonic acid, dibenzylmalonic acid, butyl(3,5-di-tert-butyl-4-hydroxybenzyl)malonic acid or bicycloheptenedicarboxylic acid radical.

A trivalent tricarboxylic acid radical $R^{12}$ is, for example, a trimellitic acid, citric acid or nitrilotriacetic acid radical.

A tetravalent tetracarboxylic acid radical $R^{12}$ is, for example, the tetravalent radical of butane-1,2,3,4-tetracarboxylic acid or of pyromellitic acid.

A divalent dicarbamic acid radical $R^{12}$ is, for example, a hexamethylenedicarbamic acid or 2,4-toluylenedicarbamic acid radical.

Preference is given to compounds of the formula II in which R is hydrogen, $R^{11}$ is hydrogen or methyl, n is 2 and $R^{12}$ is the diacyl radical of a dicarboxylic acid having 4 to 22 carbon atoms.

The following are examples of polyalkylpiperidine compounds of this class:
1) 4-hydroxy-2,2,6,6-tetramethylpiperidine
2) 1-allyl-4-hydroxy-2,2,6,6-tetramethylpiperidine
3) 1-benzyl-4-hydroxy-2,2,6,6-tetramethylpiperidine
4) 1-(4-tert-butyl-2-butenyl)-4-hydroxy-2,2,6,6-tetramethylpiperidine
5) 4-stearoyloxy-2,2,6,6-tetramethylpiperidine
6) 1-ethyl-4-salicyloyloxy-2,2,6,6-tetramethylpiperidine
7) 4-methacryloyloxy-1,2,2,6,6-pentamethylpiperidine
8) 1,2,2,6,6-pentamethylpiperidin-4-yl β-(3,5-di-tert-butyl-4-hydroxyphenyl)propionate
9) di(1-benzyl-2,2,6,6-tetramethylpiperidin-4-yl)maleate
10) di(2,2,6,6-tetramethylpiperidin-4-yl)succinate
11) di(2,2,6,6-tetramethylpiperidin-4-yl)glutarate
12) di(2,2,6,6-tetramethylpiperidin-4-yl)adipate
13) di(2,2,6,6-tetramethylpiperidin-4-yl)sebacate
14) di(1,2,2,6,6-pentamethylpiperidin-4-yl)sebacate
15) di(1,2,3,6-tetramethyl-2,6-diethyl-piperidin-4-yl)sebacate
16) di(1-allyl-2,2,6,6-tetramethylpiperidin-4-yl)phthalate
17) 1-hydroxy-4-β-cyanoethyloxy-2,2,6,6-tetramethylpiperidine
18) 1-acetyl-2,2,6,6-tetramethylpiperidin-4-yl acetate
19) tri(2,2,6,6-tetramethylpiperidin-4-yl) trimellitate
20) 1-acryloyl-4-benzyloxy-2,2,6,6-tetramethylpiperidine
21) di(2,2,6,6-tetramethylpiperidin-4-yl)diethylmalonate
22) di(1,2,2,6,6-pentamethylpiperidin-4-yl) dibutylmalonate
23) di(1,2,2,6,6-pentamethylpiperidin-4-yl)butyl(3,5-di-tert-butyl-4-hydroxybenzyl) malonate
24) di(1-octyloxy-2,2,6,6-tetramethylpiperidin-4-yl) sebacate
25) di(1-cyclohexyloxy-2,2,6,6-tetramethylpiperidin-4-yl) sebacate
26) hexane-1',6'-bis(4-carbamoyloxy-1-n-butyl-2,2,6,6-tetramethylpiperidine)
27) toluene-2',4'-bis(4-carbamoyloxy-1-n-propyl-2,2,6,6-tetramethylpiperidine)
28) tetra(2,2,6,6-tetramethylpiperidin-4-yl) butanetetracarboxylate
29) tetra(1,2,2,6,6-pentamethylpiperidin-4-yl) butanetetracarboxylate
30) tris(1-propyl-2,2,6,6-tetramethylpiperidin-4-yl) phosphite
31) tris(1-propyl-2,2,6,6-tetramethylpiperidin-4-yl) phosphate
32) phenyl bis-(1,2,6,6-pentamethylpiperidin-4-yl)phosphonate
33) 4-hydroxy-1,2,2,6,6-pentamethylpiperidine
34) 4-hydroxy-N-hydroxyethyl-2,2,6,6-tetramethylpiperidine
35) 4-hydroxy-N-(2-hydroxypropyl)-2,2,6,6-tetramethylpiperidine
36) 1-glycidyl-4-hydroxy-2,2,6,6-tetramethylpiperidine b) Compounds of the formula III,

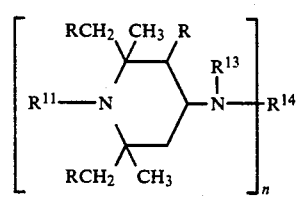

III in which n is the number 1 or 2, R and $R^{11}$ are as defined under a), $R^{13}$ is hydrogen, $C_1$-$C_{12}$alkyl, $C_2$-$C_5$hydroxyalkyl, $C_5$-$C_7$cycloalkyl, $C_7$-$C_8$aralkyl, $C_2$-$C_{18}$alkanoyl, $C_3$-$C_5$alkenoyl, benzoyl or a group of the formula

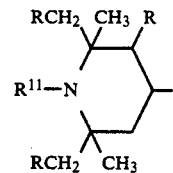

and, if n is 1, $R^{14}$ is hydrogen, $C_1$-$C_{18}$alkyl, $C_3$-$C_8$alkenyl, $C_5$-$C_7$cycloalkyl, $C_1$-$C_4$alkyl which is substituted by a hydroxyl, cyano, alkoxycarbonyl or carbamide group, glycidyl, a group of the formula —CH$_2$—CH(OH)—Z or of the formula —CONH—Z in which Z is hydrogen, methyl or phenyl; if n is 2, $R^{14}$ is $C_2$-$C_{12}$alkylene, $C_6$-$C_{12}$arylene, xylylene, a —CH$_2$—CH(OH)—CH$_2$ group or a —CH$_2$—CH(OH)—CH$_2$—O—D—O— group in which D is $C_2$-$C_{10}$alkylene, $C_6$-$C_{15}$arylene or $C_6$-$C_{12}$cycloalkylene, or, with the proviso that $R^{13}$ is not alkanoyl, alkenoyl or benzoyl, $R^{14}$ is alternatively a divalent radical of an aliphatic, cycloaliphatic or aromatic dicarboxylic acid or dicarbamic acid or may alternatively be the —CO— group, or, if n is 1, $R^{13}$ and $R^{14}$ together may be the divalent radical of an aliphatic, cycloaliphatic or aromatic 1,2- or 1,3-dicarboxylic acid.

Any $C_1$-$C_{12}$alkyl or $C_1$-$C_{18}$alkyl substituents are as defined above under a).

Any $C_5$-$C_7$cycloalkyl substituents are, in particular, cyclohexyl.

$C_7$-$C_8$aralkyl $R^{13}$ is, in particular, phenylethyl or especially benzyl.

$C_2$-$C_5$hydroxyalkyl $R^{13}$ is, in particular, 2-hydroxyethyl or 2-hydroxypropyl.

$C_2$-$C_{18}$alkanoyl $R^{13}$ is, for example, propionyl, butyryl, octanoyl, dodecanoyl, hexadecanoyl or octadecanoyl, but preferably acetyl, and $C_3$-$C_5$alkenoyl $R^{13}$ is, in particular, acryloyl.

$C_2$-$C_8$alkenyl $R^{14}$ is, for example, allyl, methallyl, 2-butenyl, 2-pentenyl, 2-hexenyl or 2-octenyl.

$C_1$-$C_4$alkyl $R^{14}$ which is substituted by a hydroxyl, cyano, alkoxycarbonyl or carbamide group may be, for example, 2-hydroxyethyl, 2-hydroxypropyl, 2-cyanoethyl, methoxycarbonylmethyl, 2-ethoxycarbonylethyl, 2-aminocarbonylpropyl or 2-(dimethylaminocarbonyl)ethyl.

Any $C_2$-$C_{12}$alkylene substituents are, for example, ethylene, propylene, 2,2-dimethylpropylene, tetramethylene, hexamethylene, octamethylene, decamethylene or dodecamethylene.

Any $C_6$-$C_{15}$arylene substituents are, for example, o-, m- or p-phenylene, 1,4-naphthylene or 4,4'-diphenylene.

$C_6$-$C_{12}$cycloalkylene D is, in particular, cyclohexylene.

Preference is given to compounds of the formula III in which n is 1 or 2, R is hydrogen, $R^{11}$ is hydrogen or methyl, $R^{13}$ is hydrogen, $C_1$-$C_{12}$alkyl or a group of the formula

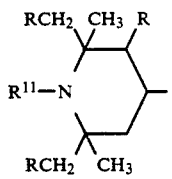

and, if n is 1, $R^{14}$ is hydrogen or $C_1$-$C_{12}$alkyl and, if n is 2, $R^{14}$ is $C_2$-$C_8$alkylene.

The following are examples of polyalkylpiperidine compounds of this class:

37) N,N'-bis(2,2,6,6-tetramethylpiperidin-4-yl)hexamethylene1,6-diamine
38) N,N'-bis(2,2,6,6-tetramethylpiperidin-4-yl)hexamethylene1,6-diacetamide
39) bis(2,2,6,6-tetramethylpiperidin-4-yl)amine
40) 4-benzoylamino-2,2,6,6-tetramethylpiperidine
41) N,N'-bis(2,2,6,6-tetramethylpiperidin-4-yl)-N,N'dibutyladipamide
42) N,N'-bis(2,2,6,6-tetramethylpiperidin-4-yl)-N,N'dicyclohexyl-2-hydroxypropylene-1,3-diamine
43) N,N'-bis(2,2,6,6-tetramethylpiperidin-4-yl)-p-xylylenediamine
44) N,N'-bis(2,2,6,6-tetramethylpiperidin-4-yl)-succinamide
45) di(2,2,6,6-tetramethylpiperidin-4-yl) N-(2,2,6,6-tetramethylpiperidin-4-yl)-β-aminodipropionate
46) The compound of the formula

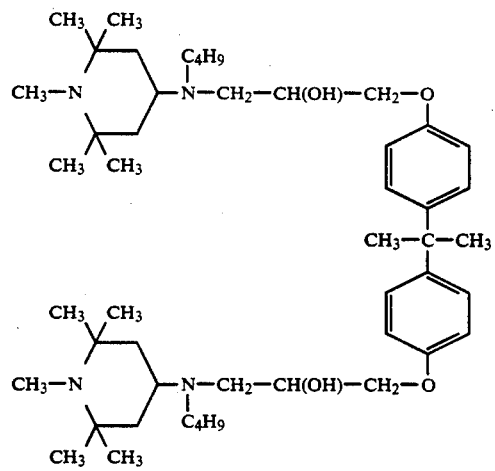

47) 4-(bis-2-hydroxyethylamino)-1,2,2,6,6-pentamethylpiperidine
48) 4-(3-methyl-4-hydroxy-5-tert-butylbenzamido)-2,2,6,6-tetramethylpiperidine
49) 4-methacrylamido-1,2,2,6,6-pentamethylpiperidine c) Compounds of the formula IV

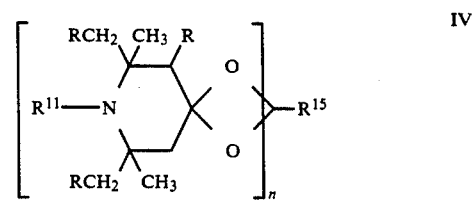

in which n is the number 1 or 2, R and $R^{11}$ are as defined under a), and, if n is 1, $R^{15}$ is $C_2$-$C_8$alkylene, $C_2$-$C_8$hydroxyalkylene or $C_4$-$C_{22}$acyloxyalkylene, and, if n is 2, $R^{15}$ is the $(-CH_2)_2C(CH_2-)_2$ group.

$C_2$-$C_8$alkylene or $C_2$-$C_8$hydroxyalkylene $R^{15}$ is, for example, ethylene, 1-methylethylene, propylene, 2-ethylpropylene or 2-ethyl-2-hydroxymethylpropylene.

$C_4$-$C_{22}$acyloxyalkylene $R^{15}$ is, for example, 2-ethyl-2-acetoxymethylpropylene.

The following are examples of polyalkylpiperidine compounds of this class:

50) 9-aza-8,8,10,10-tetramethyl-1,5-dioxaspiro[5.5]undecane
51) 9-aza-8,8,10,10-tetramethyl-3-ethyl-1,5-dioxaspiro[5.5]undecane
52) 8-aza-2,7,7,8,9,9-hexamethyl-1,4-dioxaspiro[4.5]decane
53) 9-aza-3-hydroxymethyl-3-ethyl-8,8,9,10,10-pentamethyl1,5-dioxaspiro[5.5]undecane
54) 9-aza-3-ethyl-3-acetoxymethyl-9-acetyl-8,8,10,10tetramethyl-1,5-dioxaspiro[5.5]undecane
55) 2,2,6,6-tetramethylpiperidine-4-spiro-2'-(1',3'-dioxane)-5'-spiro-5''-(1'',3''-dioxane)-2''-spiro-4'''-(2''',2''',6''',6'''tetramethylpiperidine).

d) Compounds of the formulae VA, VB and VC

VA

[Structure: polyalkylpiperidine with RCH₂, CH₃, R, R¹⁶, N—C=O, C—N—R¹⁷, bracketed subscript n, with R¹¹—N]

VB

[Structure: polyalkylpiperidine with RCH₂, CH₃, R, T₁, O—C—T₂, N—C=O, H, with R¹¹—N]

VC

[Structure: polyalkylpiperidine with RCH₂, CH₃, R, T₁, O—C—T₂, C—N—R¹⁷, bracketed subscript n, with R¹¹—N]

in which n is the number 1 or 2, R and $R^{11}$ are as defined under a), $R^{16}$ is hydrogen, $C_1$–$C_{12}$alkyl, allyl, benzyl, glycidyl or $C_2$–$C_6$alkoxyalkyl, and, if n is 1, $R^{17}$ is hydrogen, $C_1$–$C_{12}$alkyl, $C_3$–$C_5$alkenyl, $C_7$–$C_9$aralkyl, $C_5$–$C_7$cycloalkyl, $C_2$–$C_4$hydroxyalkyl, $C_2$–$C_6$alkoxyalkyl, $C_6$–$C_{10}$aryl, glycidyl or a group of the formula —$(CH_2)_p$—COO—Q or of the formula —$(CH_2)_p$—O—CO—Q in which p is 1 or 2 and Q is $C_1$–$C_4$alkyl or phenyl, and, if n is 2, $R^{17}$ is $C_2$–$C_{12}$alkylene, $C_4$–$C_{12}$alkenylene, $C_6$–$C_{12}$arylene, a —$CH_2$—CH(OH)—$CH_2$—O—D—O—$CH_2$—CH(OH)—$CH_2$— group in which D is $C_2$–$C_{10}$alkylene, $C_6$–$C_{15}$arylene or $C_6$–$C_{12}$cycloalkylene, or $R^{17}$ is a —$CH_2$CH(OZ')CH_2$—(OCH_2$—CH(OZ')CH_2)_2$— group in which Z' is hydrogen, $C_1$–$C_{18}$alkyl, allyl, benzyl, $C_2$–$C_{12}$alkanoyl or benzoyl, $T_1$ and $T_2$, independently of one another, are hydrogen, $C_1$–$C_{18}$alkyl or unsubstituted or halogen- or $C_1$–$C_4$alkyl-substituted $C_6$–$C_{10}$aryl or $C_7$–$C_9$aralkyl, or $T_1$ and $T_2$, together with the carbon atom connecting them, form a $C_5$–$C_{12}$cycloalkane ring.

Any $C_1$–$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any $C_1$–$C_{18}$alkyl substituents may be, for example, the abovementioned groups or, for example, n-tridecyl, n-tetradecyl, n-hexadecyl or n-octadecyl.

Any $C_2$–$C_6$alkoxyalkyl substituents are, for example, methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

$C_3$–$C_5$alkenyl $R^{17}$ is, for example, 1-propenyl, allyl, methallyl, 2-butenyl or 2-pentenyl.

$C_7$–$C_9$aralkyl $R^{17}$, $T_1$ and $T_2$ are, in particular, phenethyl or especially benzyl. If $T_1$ and $T_2$, together with the carbon atom, form a cycloalkane ring, this may be, for example, a cyclopentane, cyclohexane, cyclooctane or cyclododecane ring.

$C_2$–$C_4$hydroxyalkyl $R^{17}$ is, for example, 2-hydroxyethyl, 2-hydroxypropyl, 2-hydroxybutyl or 4-hydroxybutyl.

$C_6$–$C_{10}$aryl $R^{17}$, $T_1$ and $T_2$ are, in particular, phenyl, α- or β-naphthyl, unsubstituted or substituted by halogen or $C_1$–$C_4$alkyl.

$C_2$–$C_{12}$alkylene $R^{17}$ is, for example, ethylene, propylene, 2,2-dimethylpropylene, tetramethylene, hexamethylene, octamethylene, decamethylene or dodecamethylene.

$C_4$–$C_{12}$alkenylene $R^{17}$ is, in particular, 2-butenylene, 2-pentenylene or 3-hexenylene.

$C_6$–$C_{12}$arylene $R^{17}$ is, for example, o-, m- or p-phenylene, 1,4-naphthylene or 4,4'-diphenylene.

$C_2$–$C_{12}$alkanoyl Z' is, for example, propionyl, butyryl, octanoyl or dodecanoyl, but preferably acetyl.

$C_2$–$C_{10}$alkylene, $C_6$–$C_{15}$arylene or $C_6$–$C_{12}$cycloalkylene D is as defined under b).

Preferred compounds of class d) are the compounds of the formula VA in which n is 1, R is hydrogen, $R^{11}$ is hydrogen or methyl, $R^{16}$ is hydrogen or $C_1$–$C_{12}$alkyl, and $R^{17}$ is $C_1$–$C_{12}$alkyl.

The following are examples of polyalkylpiperidine compounds from class d):

56) 3-benzyl-1,3,8-triaza-7,7,9,9-tetramethylspiro[4.5]decane-2,4-dione 57) 3-n-octyl-1,3,8-triaza-7,7,9,9-tetramethylspiro[4.5]decane-2,4-dione 58) 3-allyl-1,3,8-triaza-1,7,7,9,9-pentamethylspiro[4.5]decane-2,4-dione 59) 3-glycidyl-1,3,8-triaza-7,7,8,9,9-pentamethylspiro[4.5]decane-2,4-dione 60) 1,3,7,7,8,9,9-heptamethyl-1,3,8-triazaspiro[4.5]decane-2,4-dione 61) 2-isopropyl-7,7,9,9-tetramethyl-1-oxa-3,8-diaza-4-oxospiro[4.5]decane 62) 2,2-dibutyl-7,7,9,9-tetramethyl-1-oxa-3,8-diaza-4-oxospiro[4.5]decane 63) 2,2,4,4-tetramethyl-7-oxa-3,20-diaza-21-oxodispiro[5.1.11.2]heneicosane 64) 2-butyl-7,7,9,9-tetramethyl-1-oxa-4,8-diaza-3-oxospiro[4.5]decane 65) 8-acetyl-3-dodecyl-1,3,8-triaza-7,7,9,9-tetramethylspiro[4.5]decane-2,4-dione or the compounds of the formulae below:

66)

[Structure: symmetric bis-piperidine with CH₃ groups, CH₃—N, NH—C=O, linked by C—N—CH₂CH(OH)CH₂—[OCH₂—CH(OH)CH₂]₂—N—C, O=C—NH, N—CH₃]

67)

-continued

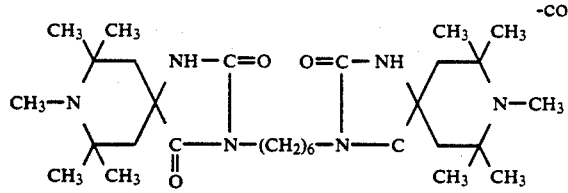

68)

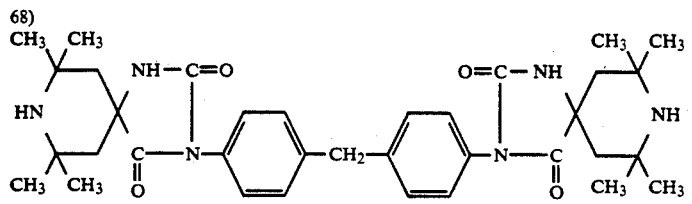

69)

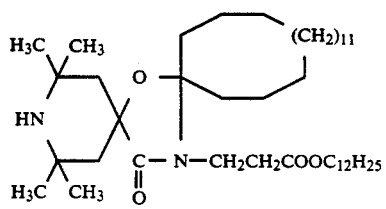

e) Compounds of the formula VI,

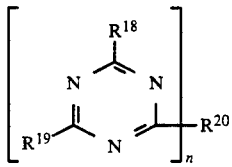 VI in which n is the number 1 or 2, and $R^{18}$ is a group of the formula

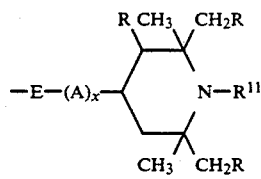

in which R and $R^{11}$ are as defined under a), E is —O— or —$NR^{21}$—, A is $C_2$–$C_6$alkylene or —$(CH_2)_3$—O—, and x is the number 0 or 1, $R^{19}$ is identical to $R^{18}$ or one of the groups —$NR^{21}R^{22}$, —$OR^{23}$, —$NHCH_2OR^{23}$ or —$N(CH_2OR^{23})_2$, $R^{20}$, if n is 1, is identical to $R^{18}$ or $R^{19}$ and, if n is 2, is an —E—B—E— group in which B is $C_2$–$C_6$alkylene which may be interrupted by —$N(R^{21})$—, $R^{21}$ is $C_1$–$C_{12}$alkyl, cyclohexyl, benzyl, $C_1$–$C_4$hydroxyalkyl or a group of the formula

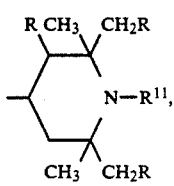

$R^{22}$ is $C_1$–$C_{12}$alkyl, cyclohexyl, benzyl or $C_1$–$C_4$hydroxyalkyl, and $R^{23}$ is hydrogen, $C_1$–$C_{12}$alkyl or phenyl, or $R^{21}$ and $R^{22}$ together are $C_4$–$C_5$alkylene or $C_4$–$C_5$oxaalkylene, for example

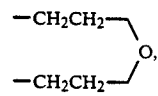

or a group of the formula

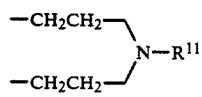

or $R^{21}$ and $R^{22}$ are alternatively each a group of the formula

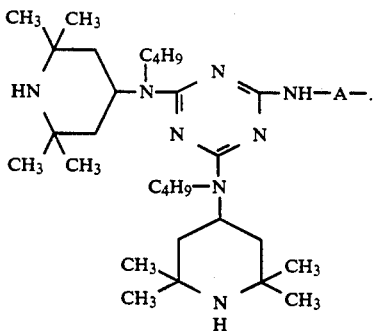

Any $C_1$–$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any $C_1$–$C_4$hydroxyalkyl substituents are, for example, 2-hydroxyethyl, 2-hydroxypropyl, 3-hydroxypropyl, 2-hydroxybutyl or 4-hydroxybutyl.

$C_2$–$C_6$alkylene A is, for example, ethylene, propylene, 2,2-dimethylpropylene, tetramethylene or hexamethylene.

If $R^{21}$ and $R^{22}$ together are $C_4$–$C_5$alkylene or $C_4$–$C_5$oxaalkylene, this is, for example, tetramethylene, pentamethylene or 3-oxapentamethylene.

Preference is given to compounds of the formula VI in which n is 4, $R^{18}$ and $R^{19}$ are a

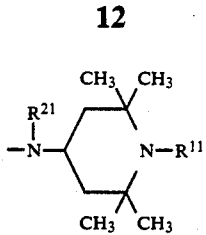

group in which $R^{11}$ is hydrogen or methyl and $R^{21}$ is hydrogen or $C_1$–$C_6$alkyl, and $R^{20}$ is a tetravalent radical of an aliphatic tetramine.

The following are examples of polyalkylpiperidine compounds from class e):

70)

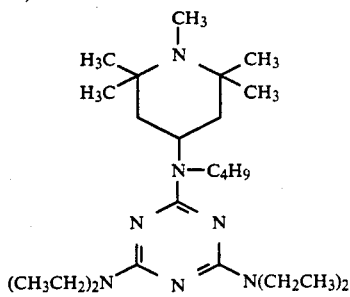

71)

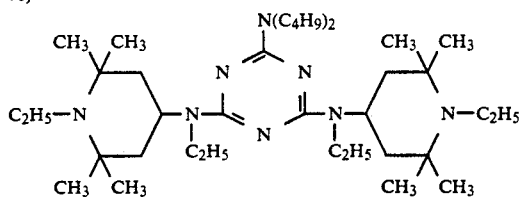

72)

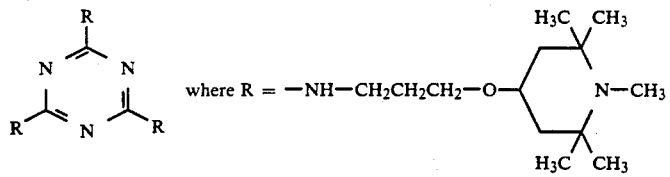

73)

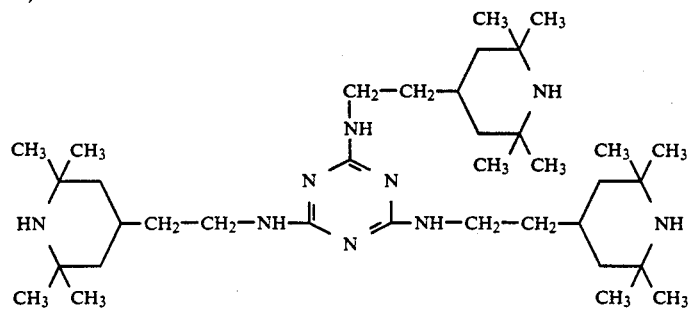

74)

-continued
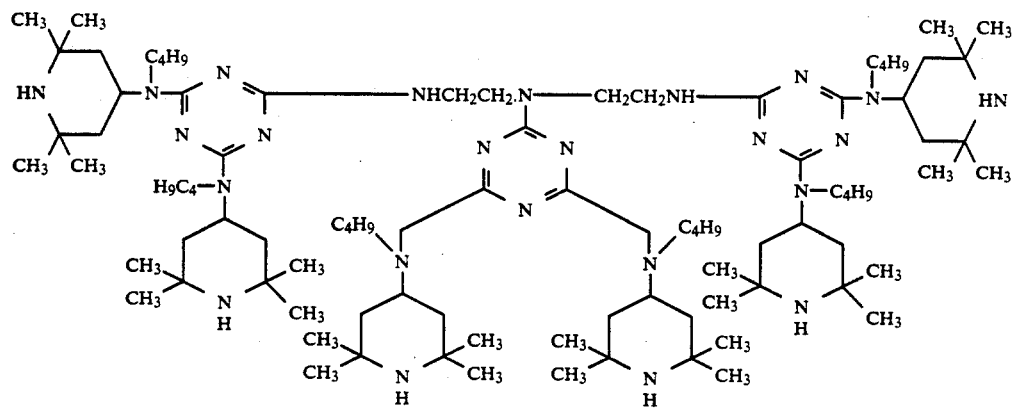
75)
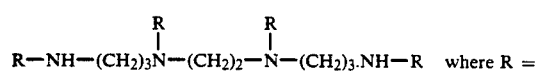
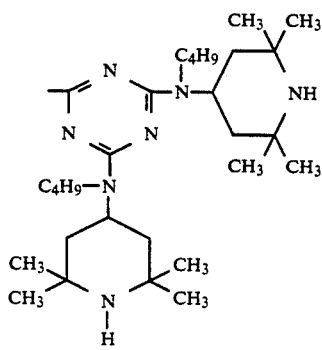
76)
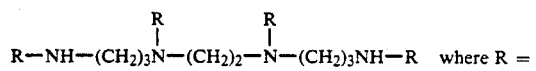
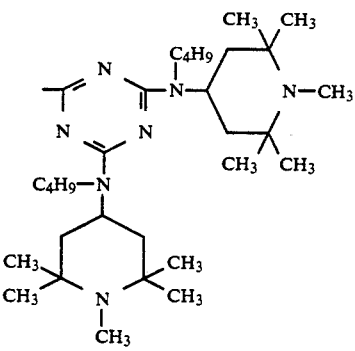
77)
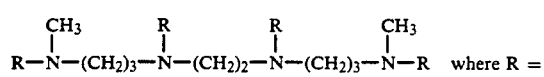
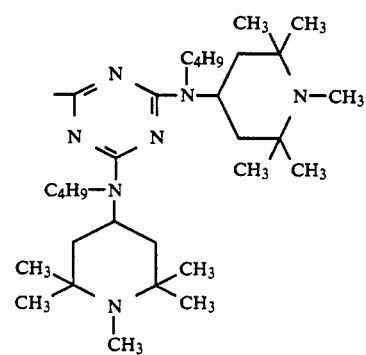
78)

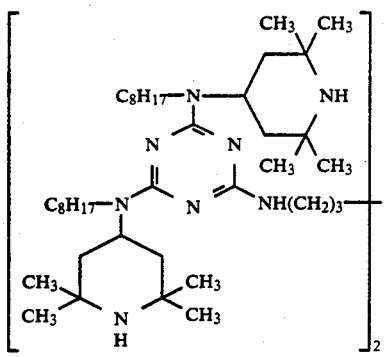

79)

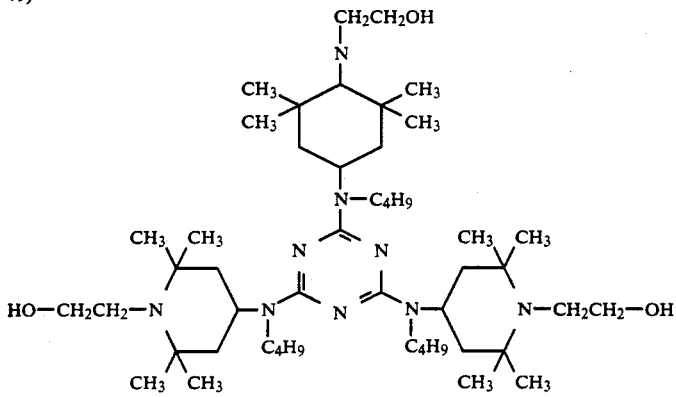

80)

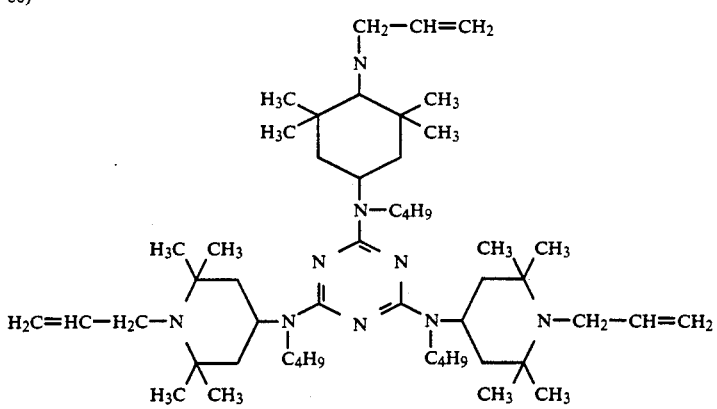

f) Oligomeric or polymeric compounds whose recurring structural unit contains a polyalkylpiperidine radical of the formula (I), in particular polyesters, polyethers, polyamides, polyamines, polyurethanes, polyureas, polyaminotriazines, poly(meth)acrylates, poly(meth)acrylamides, and copolymers thereof which contain these radicals. Of these, the polyesters and polyaminotriazines are preferred.

Examples of 2,2,6,6-polyalkylpiperidine light stabilisers from this class are compounds of the formulae below, in which m is a number from 2 to about 200.

81)

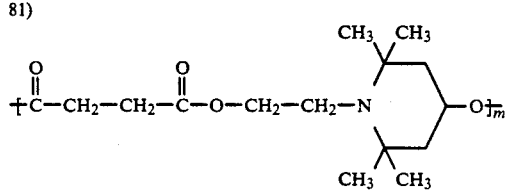

82)

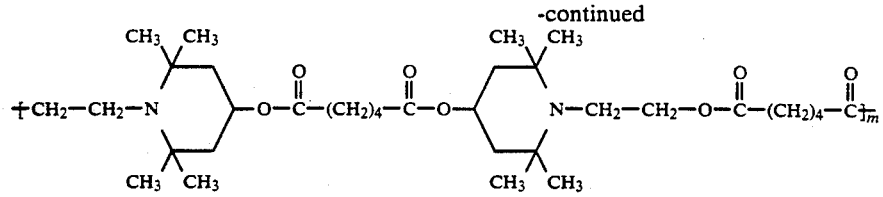
83)
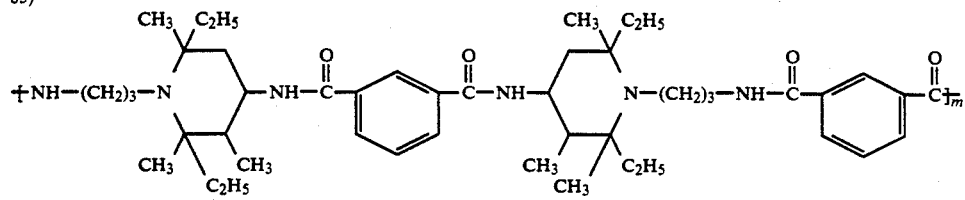
84)
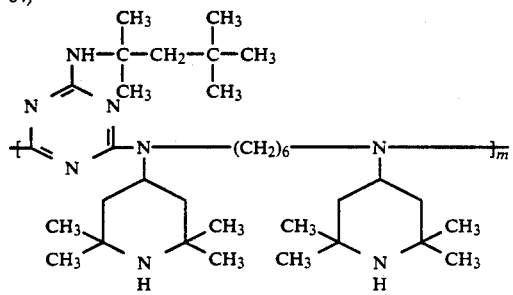
85)
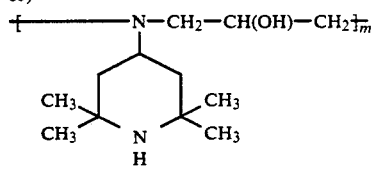
86)
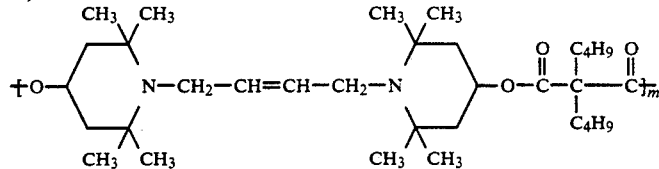
87)
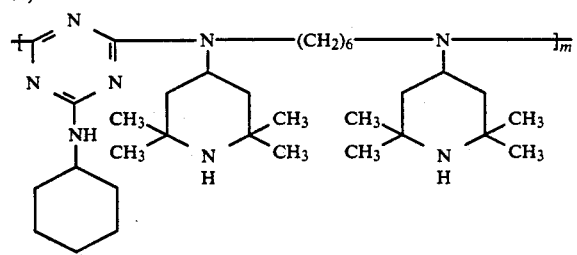
88)
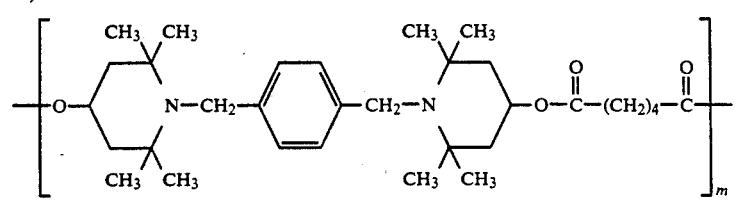
89)

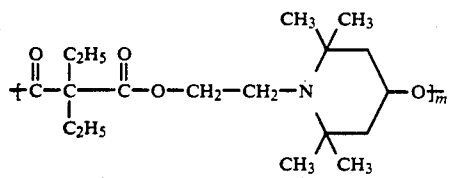

90)
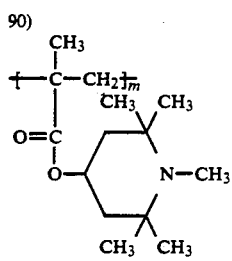

91)
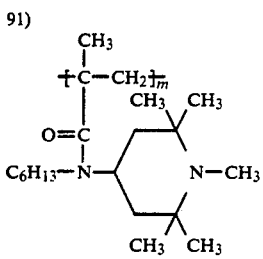

92)
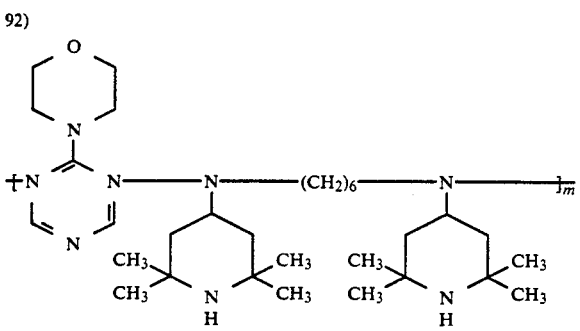

93)
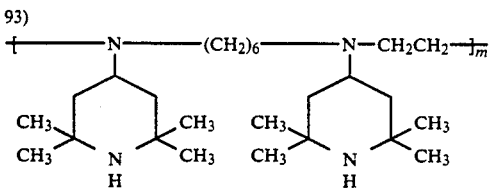

94)
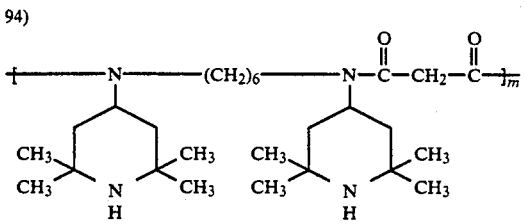

Of these classes, a), d), e) and f) are particularly preferred, in particular the compounds 10, 13, 14, 23, 24, 28, 29, 63, 65, 75, 77, 81, 84 and 92.

These sterically hindered amines are known compounds and many are commercially available. It is also possible to use two different sterically hindered amines, for example one of low molecular weight and one of higher molecular weight, as described in U.S. Pat. No. 4,692,486.

The zinc compound used as component c) may be an organozinc compound, for example the zinc salt of a carboxylic acid, sulfonic acid, phosphonic acid or phosphinic acid, or the zinc salt of a phenol or a zinc chelate, for example the enolate of a 1,3-diketo compound. Component c) may alternatively be an inorganic zinc compound, for example an oxide, hydroxide, carbonate, phosphate, phosphite, sulfate, chloride, fluoride or hypophosphite.

c) is preferably the zinc salt of a $C_1-C_{22}$carboxylic acid, of a $C_6-C_{18}$phenol or of a $C_5-C_{22}$-1,3-diketone. The carboxylic acid may be a saturated or unsaturated aliphatic or cycloaliphatic carboxylic acid or an aromatic or aromatic-aliphatic carboxylic acid.

Examples are formic acid, acetic acid, propionic acid, butyric acid, caproic acid, 2-ethylhexanoic acid, caprylic acid, lauric acid, myristic acid, enanthic acid, neodecanoic acid, palmitic acid, stearic acid, isostearic acid, 12-hydroxystearic acid, oleic acid, behenic acid, montanic acid, benzoic acid, chlorobenzoic acid, p-tert-butylbenzoic acid, p-dodecylbenzoic acid, salicylic acid, 3,4-di-tert-butyl-4-hydroxybenzoic acid, toluic acid, dimethylbenzoic acid, thioglycolic acid, lactic acid, abietic acid, β-mercaptopropionic acid, β-dodecylmercaptopropionic acid, phenylacetic acid and monoesters and monoamides of dicarboxylic acids. Zinc salts of long-chain α-aminocarboxylic acids and of α-acylaminocarboxylic acids are also suitable for this purpose.

Examples of $C_6-C_{18}$phenols are phenol, cresol, xylenol, 4-tert-butylphenol, 4-nonylphenol, 4-dodecylphenol, 4-chlorophenol and 2-hydroxybiphenyl.

Examples of $C_5-C_{22}$-1,3-diketones are acetylacetone, butanoylacetone, stearoylacetone, lauroylacetone, benzoylacetone, dibenzoylmethane, lauroylbenzoylmethane, stearoylbenzoylmethane and bis(4-methylbenzoyl)methane.

c) is preferably the zinc salt of an aliphatic $C_7-C_{20}$carboxylic acid. It is also possible to use mixtures of zinc compounds, for example zinc salts of technical grade carboxylic acid mixtures or technical grade alkylphenol mixtures. Particular preference is given to zinc stearate, zinc laurate, zinc 2-ethylhexanoate and zinc oleate.

The calcium, magnesium or barium compound used as component d) may be an organic compound, for example the calcium, magnesium or barium salt of a carboxylic acid, sulfonic acid, phosphonic acid, phosphinic acid, phenol or enol. Component d) may alternatively be an inorganic compound, for example an oxide, hydroxide, carbonate, phosphate, phosphite or hypophosphite of calcium, magnesium or barium.

d) is preferably the calcium, magnesium or barium salt of a $C_1-C_{22}$carboxylic acid or of a $C_6-C_{18}$phenol, in particular the salt of an aliphatic $C_7-C_{20}$carboxylic acid. Examples of such carboxylic acids and phenols are as described for the zinc salts. The stearates, laurates and oleates of calcium, magnesium and barium are particularly suitable.

1,3-Dicarbonyl compounds which can be used as component e) are linear or cyclic dicarbonyl compounds. Preference is given to dicarbonyl compounds of the formula VII

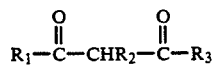

VII in which $R_1$ is $C_1-C_{22}$alkyl, $C_5-C_{10}$hydroxyalkyl, $C_2-C_{18}$alkenyl, phenyl, phenyl which is substituted by OH, $C_1-C_4$alkyl, $C_1-C_4$alkoxy or halogen, $C_7-C_{10}$phenylalkyl, $C_5-C_{12}$cycloalkyl, $C_5-C_{12}$cycloalkyl which is substituted by $C_1-C_4$alkyl, or an —$R_5$—S—$R_6$ or —$R_5$—O—$R_6$ group, $R_2$ is hydrogen, $C_1-C_8$alkyl, $C_2-C_{12}$alkenyl, phenyl, $C_7-C_{12}$alkylphenyl, $C_7-C_{10}$phenylalkyl or a —CO—$R_4$ group, $R_3$ is as defined for $R_1$ or is $C_1-C_{18}$alkoxy, $R_4$ is $C_1-C_4$alkyl or phenyl, $R_5$ is $C_1-C_{10}$alkylene, and $R_6$ is $C_1-C_{12}$alkyl, phenyl, $C_7-C_{18}$alkylphenyl or $C_7-C_{10}$phenylalkyl.

These include the hydroxyl-containing diketones of EP-A-346 279 and the oxa- and thiadiketones of EP-A-307 358.

Alkyl $R_1$ and $R_3$ may be, in particular, $C_1-C_{18}$alkyl, for example methyl, ethyl, n-propyl, isopropyl, n-butyl, tert-butyl, pentyl, hexyl, heptyl, octyl, decyl, dodecyl or octadecyl.

Hydroxyalkyl $R_1$ and $R_3$ are, in particular, —$(CH_2)_n$—OH groups in which n is 5, 6 or 7.

Alkenyl $R_1$ and $R_3$ may be, for example, vinyl, allyl, methallyl, 1-butenyl, 1-hexenyl or oleyl, preferably allyl.

OH—, alkyl-, alkoxy- or halogen-substituted phenyl $R_1$ and $R_3$ may be, for example, tolyl, xylyl, tert-butylphenyl, methoxyphenyl, ethoxyphenyl, hydroxyphenyl, chlorophenyl or dichlorophenyl.

Phenylalkyl $R_1$ and $R_3$ are, in particular, benzyl.

Cycloalkyl or alkylcycloalkyl $R_2$ and $R_3$ are, in particular, cyclohexyl or methylcyclohexyl.

Alkyl $R_2$ may be, in particular, $C_1-C_4$alkyl.

$C_2-C_{12}$alkenyl $R_2$ may be, in particular, allyl. Alkylphenyl $R_2$ may be, in particular, tolyl. Phenylalkyl $R_2$ may be, in particular, benzyl. $R_2$ is preferably hydrogen.

Alkoxy $R_3$ may be, for example, methoxy, ethoxy, butoxy, hexyloxy, octyloxy, dodecyloxy, tridecyloxy, tetradecyloxy or octadecyloxy.

$C_1-C_{10}$alkylene $R_5$ is, in particular, $C_2-C_4$alkylene.

Alkyl $R_6$ is, in particular, $C_4-C_{12}$alkyl, for example, butyl, hexyl, octyl, decyl or dodecyl. Alkylphenyl $R_6$ is, in particular, tolyl. Phenylalkyl $R_6$ is, in particular, benzyl.

Examples of 1,3-dicarbonyl compounds of the formula VII are acetylacetone, butanoylacetone, heptanoylacetone, stearoylacetone, palmitoylacetone, lauroylacetone, 7-tert-nonylthioheptane-2,4-dione, benzoylacetone, dibenzoylmethane, lauroylbenzoylmethane, palmitoylbenzoylmethane, stearoylbenzoylmethane, 5-hydroxycapronylbenzoylmethane, tribenzoylmethane, bis(4-methylbenzoyl)methane, benzoyl-p-chlorobenzoylmethane, bis(2-hydroxybenzoyl)methane, 4-methoxybenzoylbenzoylmethane, bis(4-methoxybenzoyl)methane, 1-benzoyl-1-acetylnonane, benzoylacetylphenylmethane, stearoyl-4-methoxybenzoylmethane, bis(4-tert-butylbenzoyl)methane, benzoylformylmethane, benzoylphenylacetylmethane, bis(cyclohexanoyl)methane, di(pivaloyl)methane, methyl, ethyl, hexyl, octyl, dodecyl and octadecyl acetoacetate, ethyl, butyl, 2-ethylhexyl, dodecyl and octadecyl benzoylacetate and ethyl, propyl, butyl, hexyl and octyl stearoylacetate.

Component e) is preferably a compound of the formula VII in which $R_1$ is $C_1-C_{18}$alkyl, phenyl, phenyl which is substituted by OH, methyl or methoxy, $C_7-C_{10}$phenylalkyl or cyclohexyl, $R_2$ is hydrogen, and $R_3$ is as defined for $R_1$.

The compositions according to the invention preferably comprise 100 parts by weight of component (a), from 0.01 to 2 parts by weight of component (b), from 0.01 to 3 parts by weight of component (c), from 0.01 to 3 parts by weight of component (d) and from 0.05 to 2 parts by weight of component (e), in particular 100 parts by weight of component (a), from 0.1 to 1 part by weight of component (b), from 0.1 to 2 parts by weight of component (c), from 0.1 to 2 parts by weight of component (d) and from 0.1 to 1 part by weight of component (e).

In addition, the composition may contain further additives which are known and conventional for processing and stabilising chlorine-containing polymers, for example plasticisers, phosphites, lead compounds, cadmium compounds, metal-free PVC stabilisers, impact modifiers, heat resistance improvers, epoxide compounds, antioxidants, UV absorbers, light stabilisers, pigments, dyes, fillers, lubricants and flameproofing agents.

Examples of plasticisers are the esters of phthalic acid, adipic acid, azelaic acid, sebacic acid and trimellitic acid, polyesters made from aliphatic diols and dicarboxylic acids, phosphoric acid esters, chloroparaffins and epoxidised fatty acid esters. Further examples are given in "Taschenbuch der Kunststoff-Additive" [Pocketbook of Plastics Additives], R. Gächter, H. Müller, Hanser-Verlag 1983, pages 280-307. The plasticisers may be used in an amount of from 15 to 100 parts by weight, based on 100 parts by weight of the chlorine-containing polymer.

Organic phosphites are known costabilisers for chlorine-containing polymers stabilised by means of metal carboxylates, in particular in combination with stabilisers based on zinc, barium, magnesium or cadmium. Examples of phosphites of this type are trioctyl phosphite, tridecyl phosphite, tridodecyl phosphite, decyl diphenyl phosphite, triphenyl phosphite, phenyl didecyl phosphite, tris(nonylphenyl) phosphite, trilauryl phosphite, trioctadecyl phosphite, distearyl pentaerythritol diphosphite, 2,4-di-tert-butylphenyl di(dodecyl) phosphite, tris(2,4-di-tert-butylphenyl) phosphite, diisodecyl pentaerythritol diphosphite, bis(2,4-di-tert-butylphenyl) pentaerythritol diphosphite, tristearyl sorbitol triphosphite and 3,9-bis(2,4-di-tert-butylphenoxy)-2,4,8,10-tetraoxa-3,9-diphosphaspiro[5.5]undecane.

Compounds of lead and cadmium have a similar action to the calcium, magnesium and barium compounds, but are ecologically suspect. Examples of these are the metal salts of fatty acids, for example stearates, palmitates and oleates, and inorganic salts, for example basic sulfates and phosphites.

Examples of metal-free stabilisers for chlorine-containing polymers are aliphatic polyols, such as pentaerythritol, dipentaerythritol, trimethylolpropane, tris(2-hydroxyethyl) isocyanurate, sorbitol, mannitol and furan; aminocrotonic acid esters; mercaptobenzoic acid esters; dehydracetic acid; 2,4-dihydroxybenzophenone; enol carbonates, as described in EP-A-224 438; aromatic amides, as described in EP-A-122 228 and 174 412; and nitrogen-containing heterocyclic compounds, as described in EP-A-2007, 22 087, 22 749, 41 479, 65 934, 260 226 and 354 179, DE-A-3 048 659 and 3 124 853, GB-A-2 170 203 and U.S. Pat. No. 4,908,398.

Examples of impact modifiers are polyacrylates, ethylene-vinyl acetate copolymers and chlorinated polyethylene, and examples of heat resistance improvers are poly(meth)acrylates, acrylate-maleimide copolymers and acrylonitrile-methylstyrene copolymers.

Epoxide compounds are also known stabilisers for chlorine-containing polymers. If they have a suitable structure, they may simultaneously function as plasticisers. Examples of epoxide stabilisers are epoxidised polybutadiene, epoxidised soya oil, epoxidised linseed oil, epoxidised fish oil, epoxidised tallow, methylbutyl and 2-ethylhexyl epoxystearate, tris(epoxypropyl) isocyanurate, epoxidised castor oil, epoxidised sunflower oil, 3-(2-phenoxy)-1,2-epoxypropane, bisphenol A polyglycidyl ether, vinylcyclohexene diepoxide, dicyclopentadiene diepoxide and 3,4-epoxycyclohexylmethyl-3,4-epoxycyclohexane carboxylate.

Examples of antioxidants are:

1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-i-butylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol and 2,6-dinonyl-4-methylphenol.

2. Alkylated hydroquinones, for example 2,6-di-tert-butyl-4-methoxyphenol, 2,5-di-tert-butylhydroquinone, 2,5-di-tert-amylhydroquinone and 2,6-diphenyl-4-octadecyloxyphenol.

3. Hydroxylated diphenyl thioethers, for example 2,2'-thiobis(6-tert-butyl-4-methylphenol), 2,2'-thiobis(4-octylphenol), 4,4'-thiobis(6-tert-butyl-3-methylphenol) and 4,4'-thiobis(6-tert-butyl-2-methylphenol).

4. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl) butyrate], bis(3-tert-butyl-4-hydroxy-5-methylphenyl)dicyclopentadiene and bis[2-(3'-tert-butyl-2'-hydroxy-5'-methylbenzyl)-6-tert-butyl-4-methylphenyl] terephthalate.

5. Benzyl compounds, for example 1,3,5-tris(3,5-di-tert-butyl-4-hydroxybenzyl)-2,4,6-trimethylbenzene, bis(3,5-di-tert-butyl-4-hydroxybenzyl) sulfide, isooctyl 3,5-di-tert-butyl-4-hydroxybenzylmercaptoacetate, bis(4-tert-butyl-3-hydroxy-2,6-dimethylbenzyl)dithiol terephthalate, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, dioctadecyl 3,5-di-tert-butyl-4-hydroxybenzylphosphonate, the calcium salt of monoethyl 3,5-di-tert-butyl-4-hydroxybenzylphosphonate, and 1,3,5-tris(3,5-dicyclohexyl-4-hydroxybenzyl) isocyanurate.

6. Acylaminophenols, for example 4-hydroxylauranilide, 4-hydroxystearanilide, 2,4-bis(octylmercapto)-6-(3,5-di-tert-butyl-4-hydroxyanilino)-s-triazine and octyl N-(3,5-di-tert-butyl-4-hydroxyphenyl)carbamate.

7. Esters of β-(3,5-di-tert-butyl-4-hydroxyphenyl)-propionic acid with monohydric or polyhydric alcohols, for example with methanol, octadecanol, 1,6-hexanediol, neopentyl glycol, thiodiethylene glycol, diethylene glycol, triethylene glycol, pentaerythritol, tris(hydroxyethyl) isocyanurate and N,N'-bis(hydroxyethyl)oxalamide.

8. Ester of β-(5-tert-butyl-4-hydroxy-3-methylphenyl)propionic acid with monohydric or polyhydric alcohols, for example with methanol, octadecanol, 1,6-hexanediol, neopentyl glycol, thiodiethylene glycol, diethylene glycol, triethylene glycol, pentaerythritol, tris(hydroxyethyl) isocyanurate and N,N'-bis(hydroxyethyl)oxalamide.

9. Esters of β-(3,5-dicyclohexyl-4-hydroxyphenyl)-propionic acid with monohydric or polyhydric alcohols, for example with methanol, octadecanol, 1,6-hexanediol, neopentyl glycol, thiodiethylene glycol, diethylene glycol, triethylene glycol, pentaerythritol, tris(-hydroxyethyl) isocyanurate and N,N'-bis(hydroxyethyl)oxalamide.

10. Amides of β-(3,5-di-tert-butyl-4-hydroxyphenyl)-propionic acid, for example N,N'-bis(3,5-di-tert-butyl-4-hydroxyphenylpropionyl)hexamethylenediamine, N,N'-bis(3,5-di-tert-butyl-4-hydroxyphenylpropionyl)-trimethylenediamine and N,N'-bis(3,5-di-tert-butyl-4-hydroxyphenylpropionyl)hydrazine.

Examples of UV absorbers and light stabilisers are:
1. 2-(2'-Hydroxyphenyl)benzotriazoles, for example the 5'-methyl, 3',5'-di-tert-butyl, 5'-tert-butyl, 5'-(1,1,3,3-tetramethylbutyl), 5-chloro-3',5'-di-tert-butyl, 5-chloro-3'-tert-butyl-5'-methyl, 3'-sec-butyl-5'-tert-butyl, 4'-octoxy, 3',5'-di-tert-amyl and 3',5'-bis(α,α-dimethylbenzyl) derivatives.

2. 2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivatives.

3. Esters of substituted or unsubstituted benzoic acids, for example 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate and hexadecyl 3,5-di-tert-butyl-4-hydroxybenzoate.

4. Acrylates, for example ethyl and isooctyl α-cyano-β,β-diphenylacrylate, methyl α-carbomethoxycinamate, methyl and butyl α-cyano-β-methyl-p-methoxycinamate, methyl α-carbomethoxy-p-methoxycinnamate and N-(β-carbomethoxy-β-cyanovinyl)-2-methylindoline.

5. Nickel compounds, for example nickel complexes of 2,2'-thiobis[4-(1,1,3,3-tetramethylbutyl)phenol], such as the 1:1 and 1:2 complexes, if desired with additional ligands, such as n-butylamine, triethanolamine or N-cyclohexyldiethanolamine, nickel dibutyldithiocarbamate, nickel salts of monoalkyl 4-hydroxy-3,5-di-tert-butylbenzylphosphonates, such as of the methyl or ethyl esters, nickel complexes of ketoximes, such as of 2-hydroxy-4-methylphenylundecyl ketoxime, nickel complexes of 1-phenyl-4-lauroyl-5-hydroxypyrazole, if desired with additional ligands.

6. Oxalic acid diamides, for example, 4,4'-dioctyloxyoxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and the mixture thereof with 2-ethoxy-2'-ethyl-5,4'-di-tert-butyloxanilide, and mixtures of o- and p-methoxy- and of o-and p-ethoxy-disubstituted oxanilides.

The pigments used may be inorganic, organic or metallic. Examples of fillers are chalk, carbon black, graphite, talc, kaolin or silicate minerals. However, the compositions according to the invention do not contain any hydrotalcite compounds.

Lubricants are, in particular, fatty acids and the salts, esters and amides thereof, fatty alcohols, paraffins and polyethylene waxes. Flameproofing agents are, in particular, antimony oxide, aromatic bromine compounds and phosphoric acid esters.

A review on the use of impact modifiers, colorants, fillers, lubricants and flameproofing agents in chlorine-containing polymers, in particular in PVC, is given in "Taschenbuch der Kunststoff-Additive" [Pocketbook of Plastics Additives], R. Gächter, H. Müller, Hanser-Verlag, 1983.

The compositions according to the invention can be prepared in a conventional manner. In general, the stabiliser system is incorporated into the polymer, for which purpose a range of known equipment, for example calenders, mixers, kneaders and the like, exists.

The compositions stabilised in accordance with the present invention can be shaped in a conventional manner. Examples of such processes are calendering, extrusion, injection moulding, sintering and spinning, furthermore extrusion blowing or processing by the plastisol process.

The compositions according to the invention are particularly suitable in the form of rigid formulations for hollow articles (bottles), packaging films (thermoformed films), blown films, crash-pad films (automobiles), tubes, heavy profiles (window frames), projection screen profiles, building profiles, sidings, fittings, office films and equipment casings (computers and domestic appliances).

Other compositions in the form of soft formulations are suitable for wire sheathing, cable insulation, decorative films, roof sheeting, agricultural sheeting, tubes, seal profiles, office films and sheeting for air halls.

Examples of the use of the compositions according to the invention as plastisols are artificial leather, flooring, textile coatings, curtains, coil coatings and underseal for motor vehicles.

Examples of sintered PVC applications of the compositions according to the invention are slush, slush mould and coil coatings.

The examples below illustrate the invention in greater detail. All parts and percentages relate to the weight, unless stated otherwise.

The hindered amines and 1,3-diketones below are used in the examples:

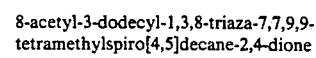

8-acetyl-3-dodecyl-1,3,8-triaza-7,7,9,9-tetramethylspiro[4,5]decane-2,4-dione     H-1

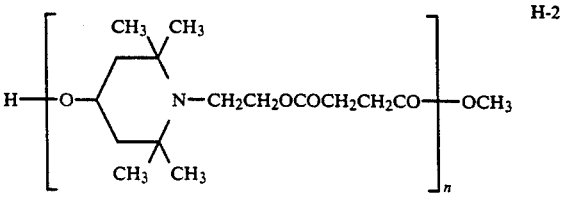

di-(1,2,2,6,6-pentamethylpiperidin-4-yl)sebacate     H-3

-continued

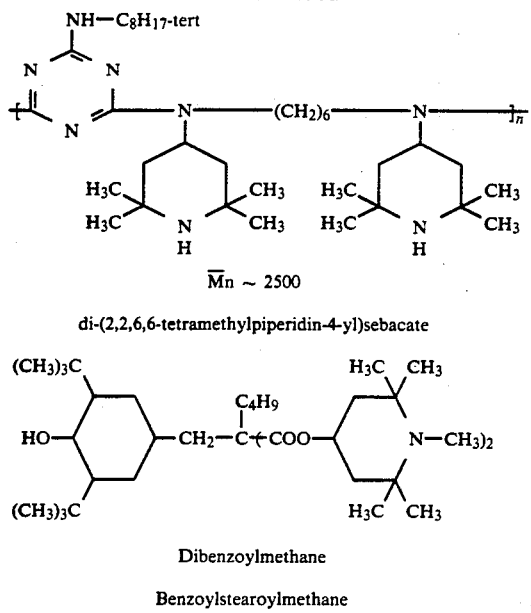

di-(2,2,6,6-tetramethylpiperidin-4-yl)sebacate   H-5

Dibenzoylmethane   D-1

Benzoylstearoylmethane   D-2

EXAMPLE 1

A semi-rigid PVC composition is prepared in accordance with the following recipe:
100 parts by weight of suspension PVC having a K-value of 70 (Vinnol ® H 70 DF),
17 parts by weight of dioctylphthalate,
3 parts by weight of epoxidised soya oil (Reoplast ® 39),
1 part by weight of didecyl phenyl phosphite,
0.5 part by weight of zinc oleate,
0.8 part by weight of barium p-tert-butylbenzoate,
0.6 part by weight of butyl glycol and
0.3 part by weight of sterically hindered amine.

One part of the samples is additionally mixed with 0.3 part of a diketone. The constituents are homogenised for 5 minutes at 180° C. on mixing rolls, forming a 0.3 mm thick film. Samples are cut from the film and warmed to 180° C. in a test oven (Mathis Thermotester ® LTF-ST). The discoloration which occurs is measured in accordance with ASTM D 1925-70 as the yellowness index (YI). The higher this index, the greater the discoloration. Table 1 shows the results.

TABLE 1

| Hindered amine*) | Diketone*) | Yellowness index after |  |  |  |  |  |  |  |
|---|---|---|---|---|---|---|---|---|---|---|
|  |  | 0 | 6 | 12 | 18 | 24 | 30 | 36 | 42 | min |
| 0.3 H-1 | — | 14 | 15 | 19 | 23 | 25 | 21 | 21 | 24 |  |
| 0.3 H-1 | 0.3 D-1 | 8 | 9 | 9 | 9 | 9 | 11 | 13 | 15 |  |
| 0.3 H-2 | — | 11 | 13 | 17 | 18 | 20 | 18 | 18 | 20 |  |
| 0.3 H-2 | 0.3 D-1 | 7 | 8 | 8 | 9 | 9 | 10 | 15 | 17 |  |
| 0.3 H-3 | — | 9 | 12 | 16 | 18 | 21 | 17 | 17 | 18 |  |
| 0.3 H-3 | 0.3 D-1 | 8 | 9 | 10 | 11 | 10 | 10 | 12 | 9 |  |
| 0.3 H-4 | — | 14 | 17 | 22 | 24 | 30 | 35 | 37 | 42 |  |
| 0.3 H-4 | 0.3 D-1 | 12 | 13 | 14 | 15 | 14 | 17 | 18 | 20 |  |
| 0.3 H-5 | — | 9 | 11 | 15 | 21 | 17 | 19 | 20 | 23 |  |
| 0.3 H-5 | 0.3 D-1 | 8 | 9 | 10 | 10 | 10 | 11 | 13 | 14 |  |
| 0.3 H-6 | — | 9 | 13 | 16 | 21 | 23 | 26 | 11 | 20 |  |
| 0.3 H-6 | 0.3 D-1 | 8 | 9 | 9 | 9 | 20 | 91 | 11 | 11 |  |

*)Parts per 100 parts of PVC

It can be seen that the samples containing the diketone (D-1) remain paler over the entire measured time than the samples without diketone.

EXAMPLE 2

A rigid PVC formulation is mixed from the following components:
100 parts by weight of suspension PVC having a K-value of 60 (Corvic ® S 60/104),
3 parts by weight of epoxidised soya oil (Reoplast ® 39),
1.2 parts by weight of zinc stearate and
0.6 part by weight of calcium stearate The amounts of hindered amine and diketone indicated in Table 2 are added. The constituents are mixed for 5 minutes at 190° C. on mixing rolls to give a 0.3 mm thick film.

The samples cut from the films are heated at 180° C. as in Example 1, and the yellowness index is measured at intervals of 5 minutes.

TABLE 2

| Hindered amine*) | Diketone*) | Yellowness index after |  |  |  |  |  |  |  |  |
|---|---|---|---|---|---|---|---|---|---|---|---|
|  |  | 5 | 10 | 15 | 20 | 25 | 30 | 35 | 40 | min |
| 0.3 H-4 | — | 49 | 56 | 63 | 64 | 66 | 68 | 69 | 69 |  |
| 0.3 H-4 | 0.1 D-2 | 11 | 13 | 16 | 22 | 33 | 48 | 55 | 58 |  |
| 0.3 H-4 | 0.3 D-2 | 10 | 12 | 15 | 17 | 20 | 29 | 44 | 50 |  |

*)Parts per 100 parts of PVC

The paling effect of the diketone, which is particularly pronounced in the first 25 minutes, can also be seen here.

EXAMPLE 3

Samples of a rigid PVC formulation are prepared as described in Example 2 from the following components:
100 parts by weight of a suspension PVC having a K-value of 67 (Vestolit ® P 1982 K),
6 parts by weight of chalk (Omya ® 95 T),
4 parts by weight of titanium dioxide (Kronos ® CL 220),
1 part by weight of PMMA-based processing assistant (Irgamod ® F 138),
0.5 part by weight of didecyl phenyl phosphite
0.8 part by weight of zinc stearate,
1.1 part by weight of barium laurate and
0.1 part by weight of bisphenol A The amounts of hindered amine and 1,3-diketone indicated in Table 3 are added. Table 3 shows the values for the yellowness index on heating at 190° C.

TABLE 3

| Hindered amine*) | Diketone*) | Yellowness index after |  |  |  |  |  |  |  |  |
|---|---|---|---|---|---|---|---|---|---|---|---|
|  |  | 5 | 10 | 15 | 20 | 25 | 30 | 35 | 40 | min |
| 0.3 H-4 | — | 23 | 25 | 37 | 40 | 43 | 44 | 46 | 55 |  |
| 0.3 H-4 | 0.1 D-2 | 18 | 20 | 24 | 26 | 29 | 33 | 36 | 41 |  |
| 0.3 H-4 | 0.3 D-2 | 11 | 13 | 14 | 17 | 19 | 23 | 29 | 37 |  |

*)Parts per 100 parts of PVC

EXAMPLE 4

Samples of a semi-rigid PVC composition are prepared as described in Example 2 from the following components:
100 parts by weight of a suspension PVC having a K-value of 71 (Corvic ® S 71/102),
20 parts by weight of dioctyl phthalate,
0.64 part by weight of didecyl phenyl phosphite
0.52 part by weight of zinc oleate,
0.59 part by weight of barium tert-butylbenzoate,
0.07 part by weight of 2,6-di(tert-butyl)-p-kresol and 0.16 part by weight of an aromatic solvent mixture (Shellsol ® A).

The amounts of hindered amine and 1,3-diketone indicated in Table 4 are added. Table 4 shows the yellowness index of the samples on heating at 190° C.

TABLE 4

| Hindered amine*) | Diketone*) | Yellowness index after |  |  |  |  |  |  |  |
|---|---|---|---|---|---|---|---|---|---|
|  |  | 5 | 10 | 15 | 20 | 25 | 30 | 35 | 40 min |
| 0.3 H-4 | — | 8 | 14 | 18 | 23 | 26 | 30 | 39 | 59 |
| 0.3 H-4 | 0.1 D-2 | 5 | 5 | 7 | 9 | 12 | 17 | 25 | 43 |
| 0.3 H-4 | 0.3 D-2 | 4 | 5 | 5 | 6 | 7 | 10 | 13 | 22 |

*)Parts per 100 parts of PVC

The considerable paling action of the diketone over the entire test period can be seen here.

EXAMPLE 5

Samples of the following semi-rigid composition are prepared as described in Example 2:
100 parts by weight of a suspension PVC having a K-value of 71 (Corvic ® S 71/102),
20 parts by weight of dioctyl phthalate,
0.6 part by weight of didecyl phenyl phosphite,
0.57 part by weight of zinc oleate,
0.27 part by weight of calcium p-tert-butylbenzoate, and
0.52 part by weight of an aromatic sovent mixture (Shellsol ® A).

The amounts of hindered amine and 1,3-diketone indicated in Table 5 are added. Table 5 shows the yellowness index of the samples on heating at 190° C.

TABLE 5

| Hindered amine*) | Diketone*) | Yellowness index after |  |  |  |  |  |
|---|---|---|---|---|---|---|---|
|  |  | 5 | 10 | 15 | 20 | 25 | 30 min |
| 0.3 H-4 | — | 6 | 7 | 9 | 13 | 17 | 23 |
| 0.3 H-4 | 0.1 D-2 | 4 | 5 | 6 | 8 | 12 | 19 |
| 0.3 H-4 | 0.3 D-2 | 4 | 4 | 5 | 7 | 9 | 17 |

*)Parts per 100 parts of PVC

A considerable positive effect of the diketone over the entire test period can be seen here.

What is claimed is:

1. A stabilised chlorine-containing polymer composition comprising
   a) at least one chlorine-containing polymer,
   b) at least one sterically hindered amine,
   c) at least one organic or inorganic zinc compound,
   d) at least one organic or inorganic calcium, magnesium and/or barium compound, and
   e) at least one 1,3-dicarbonyl compound, but no organotin compounds, no hydrotalcite compounds and no blowing agents or foaming agents.

2. A polymer composition according to claim 1, wherein component a) is a polyvinyl chloride or a copolymer containing at least 80% of vinyl chloride, or a mixture (polyblend) of a polymer of this type with another chlorine-containing or chlorine-free polymer.

3. A polymer composition according to claim 1, wherein component b) is a polyalkylpiperidine derivative containing at least one group of the formula I

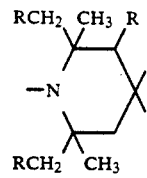

in which R is hydrogen or methyl.

4. A polymer composition according to claim 3, in which R in the formula I is hydrogen.

5. A polymer composition according to claim 3, wherein component b) is a polyalkylpiperidine derivative of the formula II

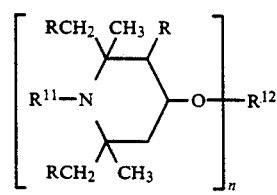

in which R is hydrogen, $R^{11}$ is hydrogen or methyl, n is 2 and $R^{12}$ is the diacyl radical of a dicarboxylic acid having 4 to 22 carbon atoms.

6. A polymer composition according to claim 3, wherein component b) is a polyalkylpiperidine compound of the formula VA

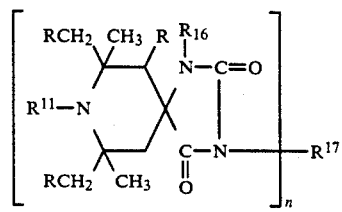

in which n is 1, R is hydrogen, $R^{11}$ is hydrogen or methyl, $R^{16}$ is hydrogen or $C_1$-$C_{12}$alkyl and $R^{17}$ is $C_1$-$C_{12}$alkyl, allyl or benzyl.

7. A polymer composition according to claim 3, wherein component b) is a polyalkylpiperidine compound of the formula VI

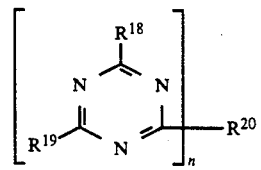

in which n is 4, $R^{18}$ and $R^{19}$ are a

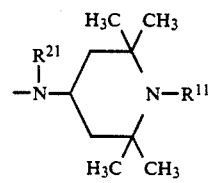

group in which $R^{11}$ is hydrogen or methyl and $R^{21}$ is hydrogen or $C_1-C_6$alkyl, and $R^{20}$ is the tetravalent radical of an aliphatic tetramine.

8. A polymer composition according to claim 3, wherein component b) is an oligomeric or polymeric polyalkylpiperidine compound from the series comprising the polyesters and polyaminotriazines.

9. A polymer composition according to claim 1, wherein component c) is the zinc salt of a $C_1-C_{22}$carboxylic acid, of a $C_6-C_{18}$phenol or of a $C_5-C_{12}$-1,3-diketone.

10. A polymer composition according to claim 1, wherein c) is the zinc salt of an aliphatic $C_7-C_{20}$carboxylic acid.

11. A polymer composition according to claim 1, wherein component d) is the calcium, magnesium or barium salt of a $C_1-C_{22}$carboxylic acid, of a $C_5-C_{12}$-1,3-diketone or of a $C_6-C_{18}$phenol.

12. A polymer composition according to claim 11, wherein d) is the calcium, magnesium or barium salt of an aliphatic $C_7-C_{20}$carboxylic acid.

13. A polymer composition according to claim 1, wherein component e) is a 1,3-dicarbonyl compound of the formula VII

VII in which $R_1$ is $C_1-C_{22}$alkyl, $C_5-C_{10}$hydroxyalkyl, $C_2-C_{18}$alkenyl, phenyl, phenyl which is substituted by OH, $C_2-C_4$alkyl, $C_1-C_4$alkoxy or halogen, $C_7-C_{10}$phenylalkyl, $C_5-C_{12}$cycloalkyl, $C_5-C_{12}$cycloalkyl which is substituted by $C_1-C_4$alkyl, or an $-R_5-S-R_6$ or $-R_5-O-R_6$ group, $R_2$ is hydrogen, $C_1-C_8$alkyl, $C_2-C_{12}$alkenyl, phenyl, $C_7-C_{12}$alkylphenyl, $C_7-C_{10}$phenylalkyl or a $-CO-R_4$ group, $R_3$ is as defined for $R_1$ or is $C_1-C_{18}$alkoxy, $R_4$ is $C_1-C_4$alkyl or phenyl, $R_5$ is $C_1-C_{10}$alkylene, and $R_6$ is $C_1-C_{12}$alkyl, phenyl, $C_7-C_{18}$alkylphenyl or $C_7-C_{10}$phenylalkyl.

14. A polymer composition according to claim 13, wherein component e) is a compound of the formula VII in which $R_1$ is $C_1-C_{18}$alkyl, phenyl, phenyl which is substituted by OH, methyl or methoxy, $C_7-C_{10}$phenylalkyl or cycloalkyl, $R_2$ is hydrogen, and $R_3$ is as defined for $R_1$.

15. A polymer composition as claimed in claim 1, comprising 100 parts by weight of (a), from 0.01 to 2 parts by weight of (b), from 0.01 to 3 parts by weight of (c), from 0.01 to 3 parts by weight of (d) and from 0.05 to 2 parts by weight of (e).

16. A polymer composition according to claim 15, comprising 100 parts by weight of (a), from 0.1 to 1 part by weight of (b), from 0.1 to 2 parts by weight of (c), from 0.1 to 2 parts by weight of (d) and from 0.1 to 1 part by weight of (e).

17. A polymer composition according to claim 1, containing, in addition to components (a) to (e), one or more additives from the group consisting of plasticisers, phosphites, lead compounds, cadmium compounds, metal-free PVC stabilisers, impact modifiers, heat resistance improvers, epoxide compounds, antioxidants, UV absorbers, light stabilisers, pigments, dyes, fillers, lubricants and flameproofing agents.

18. A process for a stabilising chlorine-containing polymer against damage by heat and light, which comprises by adding a) at least one sterically hindered amine,
b) at least one organic or inorganic zinc compound,
c) at least one organic or inorganic calcium, magnesium and/or barium compound,
d) at least one 1,3-dicarbonyl compound, and, if desired, further additives, but no organotin compounds, hydrotalcite compounds, blowing agents or foaming agents.

* * * * *